United States Patent
Fricke

(10) Patent No.: US 10,315,683 B1
(45) Date of Patent: Jun. 11, 2019

(54) ADJUSTABLE STEERING COLUMN ASSEMBLY

(71) Applicants: THYSSENKRUPP PRESTA AG, Eschen (LI); THYSSENKRUPP AG, Essen (DE)

(72) Inventor: Sascha Fricke, Hard (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 99 days.

(21) Appl. No.: 15/818,300

(22) Filed: Nov. 20, 2017

(51) Int. Cl.
*B62D 1/181* (2006.01)
*B62D 1/185* (2006.01)

(52) U.S. Cl.
CPC ............ *B62D 1/185* (2013.01); *B62D 1/181* (2013.01)

(58) Field of Classification Search
CPC ................................. B62D 1/185; B62D 1/181
See application file for complete search history.

(56) References Cited

U.S. PATENT DOCUMENTS

| | | | | |
|---|---|---|---|---|
| 7,497,470 B2 * | 3/2009 | Streng | ............... | B62D 1/192 188/371 |
| 2007/0039403 A1 * | 2/2007 | Manwaring | ............ | B62D 1/192 74/492 |
| 2009/0200783 A1 * | 8/2009 | Cymbal | ................. | B62D 1/185 280/775 |
| 2014/0311274 A1 * | 10/2014 | Hong | .................... | B62D 1/184 74/493 |
| 2015/0232117 A1 * | 8/2015 | Stinebring | ............. | B62D 1/195 74/493 |
| 2015/0251683 A1 | 9/2015 | Caverly et al. | | |
| 2016/0046318 A1 * | 2/2016 | Stinebring | ............. | B62D 1/181 74/493 |

* cited by examiner

*Primary Examiner* — Drew J Brown
(74) *Attorney, Agent, or Firm* — Lathrop Gage L.L.P.

(57) ABSTRACT

One steering column assembly includes an outer jacket having a first end, a cavity defined by an inner surface extending from the first end, and protrusions extending from the inner surface into the cavity. Each protrusion includes a front end at or adjacent the first end, a rear end, and a curved contact surface telescopically supporting an inner jacket. The front end has first and second endpoints, the rear end has third and fourth endpoints, and one side connects the first and third endpoints while another side connects the second and fourth endpoints. Each protrusion is configured such that, when the front and rear ends and the sides are projected onto a flat surface and an angle is measured between one straight line passing through the first and third endpoints and another straight line passing through the second and fourth endpoints, the measurement is from one to fifteen degrees.

20 Claims, 4 Drawing Sheets

ADJUSTABLE STEERING COLUMN ASSEMBLY

FIELD OF THE DISCLOSURE

The disclosure relates generally to the field of steering column assemblies for motor vehicles. More specifically, the disclosure relates to adjustable steering column assemblies.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a steering column assembly is provided for use with a vehicle. The steering column assembly includes a steering shaft having a longitudinal axis, an inner jacket supporting the steering shaft with the steering shaft being rotatable about the longitudinal axis, and an outer jacket. The outer jacket includes a first end that is passenger facing and an opposite second end, a cavity defined by an inner surface extending from the first end toward the second end, and at least two protrusions extending from the inner surface into the cavity. Each protrusion includes a curved contact surface, a front end at or adjacent the outer jacket first end, and a rear end extending toward the outer jacket second end. The front end has first and second endpoints with a front arc length therebetween, the rear end has third and fourth endpoints with a rear arc length therebetween, and two sides respectively connect the first and second endpoints of the front end with the third and fourth endpoints of the rear end, such that a first of the sides is associated with the first and third endpoints and a second of the sides is associated with the second and fourth endpoints. Each of the at least two protrusions is configured such that, when the front end, the rear end, and the two sides are projected onto a flat surface and an angle is measured between one straight line passing through the first and third endpoints and another straight line passing through the second and fourth endpoints, the resulting angular measurement is at least one degree and no more than fifteen degrees. And the curved contact surface of each of the at least two protrusions supports the inner jacket with the inner jacket being telescopic along the longitudinal axis.

In an embodiment, the angular measurement is at least one degree and no more than three degrees.

In an embodiment, the front arc length is larger than the rear arc length.

In an embodiment, the front arc length is smaller than the rear arc length.

In an embodiment, each of the two sides is linear.
In an embodiment, each of the two sides is concave.
In an embodiment, each of the two sides is convex.
In an embodiment, the at least two protrusions is three protrusions.
In an embodiment, the at least two protrusions is four protrusions.
In an embodiment, the at least two protrusions is five protrusions.
In an embodiment, the steering column assembly further includes an actuator for moving the inner jacket relative to the outer jacket along the longitudinal axis.

In an embodiment, the steering shaft has an end for receiving a steering wheel.

According to another embodiment, a steering column assembly for use with a vehicle includes a steering shaft having a longitudinal axis, an inner jacket supporting the steering shaft with the steering shaft being rotatable about the longitudinal axis, and an outer jacket. The outer jacket includes a first end and an opposite second end, a cavity defined by an inner surface extending from the first end toward the second end, and at least two protrusions extending from the inner surface into the cavity. Each protrusion includes a curved contact surface, a front end at or adjacent the outer jacket first end, and a rear end extending toward the outer jacket second end and being spaced apart from the front end by a fixed length. The front end has first and second endpoints with a front arc length therebetween, and the rear end has third and fourth endpoints with a rear arc length therebetween. Each of the at least two protrusions is configured such that, when the front end and the rear end are projected onto a flat surface with the front end being separated from the rear end by the fixed length, the first and second endpoints being perpendicularly equidistant from a centerline, the third and fourth endpoints being perpendicularly equidistant from the centerline, the first and third endpoints being on one side of the centerline, and the second and fourth endpoints being on an opposite side of the centerline, the resulting angular measurement between one straight line passing through the first and third endpoints and another straight line passing through the second and fourth endpoints is at least one degree and no more than fifteen degrees. And the curved contact surface of each of the at least two protrusions supports the inner jacket with the inner jacket being telescopic along the longitudinal axis.

In an embodiment, the angular measurement is at least one degree and no more than three degrees.

In an embodiment, the angular measurement is two degrees.

In an embodiment, the front arc length is larger than the rear arc length.

In an embodiment, the front arc length is smaller than the rear arc length.

In an embodiment, the at least two protrusions is three protrusions.

In an embodiment, the at least two protrusions is four protrusions.

In an embodiment, the at least two protrusions is five protrusions.

In an embodiment, the steering column assembly further includes an actuator for moving the inner jacket relative to the outer jacket along the longitudinal axis.

According to still another embodiment, an outer jacket is provided for use in a vehicle steering column assembly to telescopically support an inner jacket. The outer jacket includes a first end and an opposite second end, a cavity defined by an inner surface extending from the first end toward the second end, and at least two protrusions extending from the inner surface into the cavity. Each protrusion includes a curved contact surface, a front end at or adjacent the outer jacket first end, and a rear end extending toward the outer jacket second end. The front end has first and second endpoints with a front arc length therebetween, and the rear end has third and fourth endpoints with a rear arc length therebetween. Two sides respectively connect the first and second endpoints of the front end with the third and fourth endpoints of the rear end, such that a first of the sides is associated with the first and third endpoints and a second of the sides is associated with the second and fourth endpoints.

Each of the at least two protrusions is configured such that, when the front end, the rear end, and the two sides are projected onto a flat surface and an angle is measured between one straight line passing through the first and third endpoints and another straight line passing through the second and fourth endpoints, the resulting angular measurement is at least one degree and no more than fifteen degrees.

In an embodiment, the angular measurement is at least one degree and no more than three degrees.

In an embodiment, each of the sides is selected from the group consisting of straight, concave, and convex.

DETAILED DESCRIPTION

Steering column assemblies that allow a steering wheel to move toward and away from a driver along a longitudinal axis of a steering shaft are known in the art, and actuators such as electric motors are used to move the steering shaft longitudinally. For example, U.S. 2015/0251683 to Caverly, assigned to STEERING SOLUTIONS IP HOLDING CORPORATION, the contents of which are hereby incorporated in their entirety by reference, discloses a steering wheel capable of moving longitudinally. The '683 Publication provides telescopic outer (or "lower") and inner (or "upper") jackets, and the outer jacket has a flat cylindrical inner surface to support the inner jacket. While that configuration may ultimately allow the inner jacket to move to desired positions, embodiments of the present disclosure may have improved performance over the prior art in increasing eigenfrequency and stiffness of the steering column.

Figure 1:
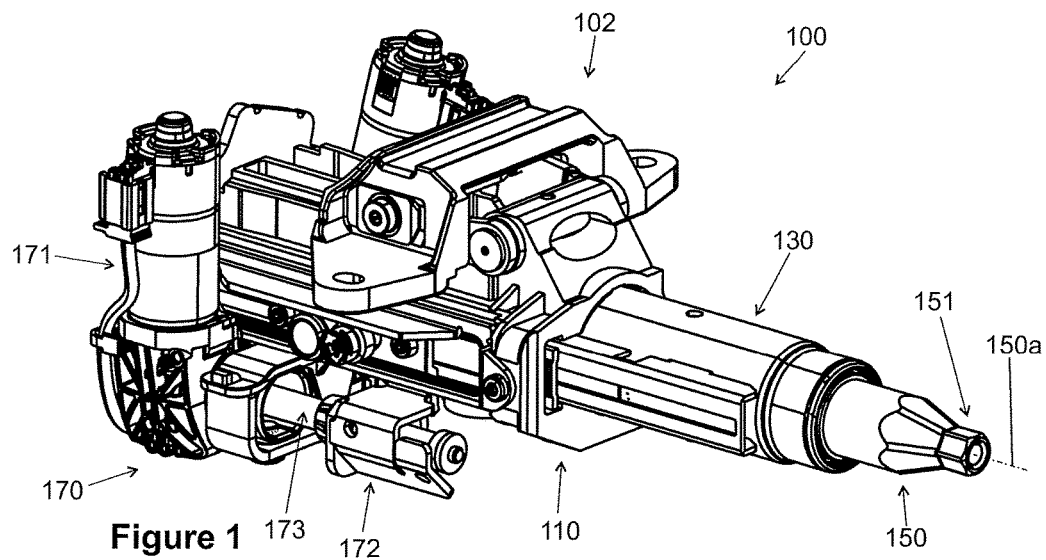
FIG. 1 is a perspective view showing an adjustable steering column assembly, according to an embodiment of the present disclosure.
Figure 2:
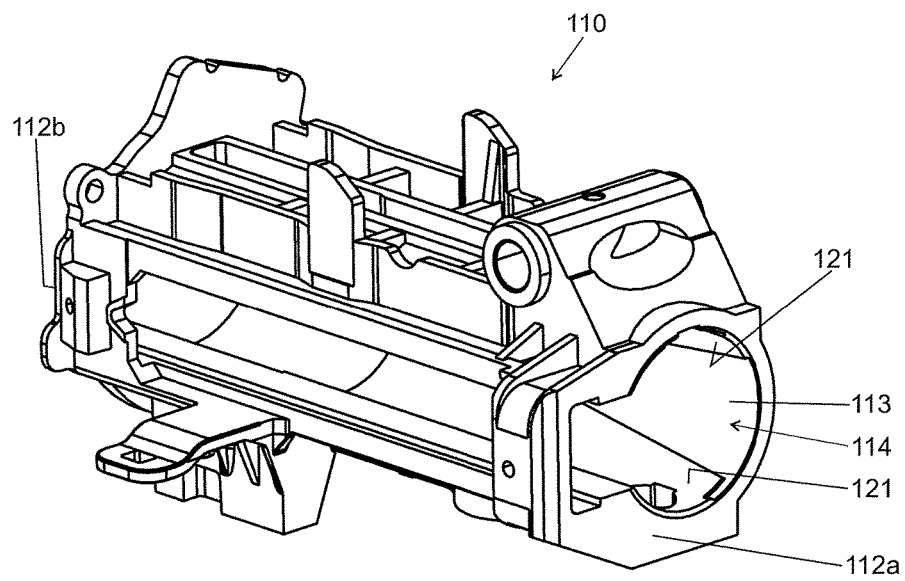
FIG. 2 is a perspective view showing the outer jacket of the steering column assembly of FIG. 1.

FIG. 1 illustrates an adjustable steering column assembly 100, according to one embodiment. The adjustable steering column assembly 100 broadly includes an outer (or "lower") jacket 110, an inner (or "upper") jacket 130, and a steering shaft (or "spindle") 150. The outer jacket 110 telescopically supports the inner jacket 130, and the inner jacket 130 rotatably supports the steering shaft 150 about a longitudinal axis 150a of the steering shaft 150 (such as through bearings). A steering wheel is coupled (directly or indirectly) to end 151 of the steering shaft 150, and rotation of the steering wheel causes the steering shaft 150 to rotate—which ultimately causes an automobile having the steering column assembly 100 to turn. The outer jacket 110 may be fastened to a bracket 102 which is coupled to the vehicle's chassis or other environmental structure, and may be allowed to tilt and lock relative to the bracket 102; accordingly, a driver may be able to incline the steering wheel in accordance with his preferences, though only along a predetermined range of motion. And an actuator 170 (for example, an electric motor, a hydraulic motor, et cetera) may cause the inner jacket 130 to move relative to the outer jacket 110 along the longitudinal axis 150a.

In the embodiment of FIG. 1, the actuator 170 includes an electric motor 171 and gearing for using rotational motion of the electric motor 171 to move the inner jacket 130 telescopically. More specifically, a drive bracket 172 cooperates with a leadscrew 173 to transfer linear motion to the inner jacket 130 during telescopic adjustment of the steering column assembly 100. When telescopic movement is commanded, the actuator 170 is operated to vary the telescopic relationship between the inner jacket 130 and the outer jacket 110.

Focusing now on the outer jacket 110, the outer jacket 110 has a first end 112a that is passenger facing (i.e., which faces a passenger compartment of the vehicle) and an opposite second end 112b, and a cavity 114 defined by an inner surface 113 extends from the first end 112a toward the second end 112b. The outer jacket 110 may include at least one slit 115 extending from the cavity 114 for guiding the inner jacket 130, and at least two protrusions 121 extend from the inner surface 113 into the cavity 114. In some embodiments, it may be desirable to have three, four, or five protrusions 121, and particularly desirable to have three protrusions 121.

Figure 4:
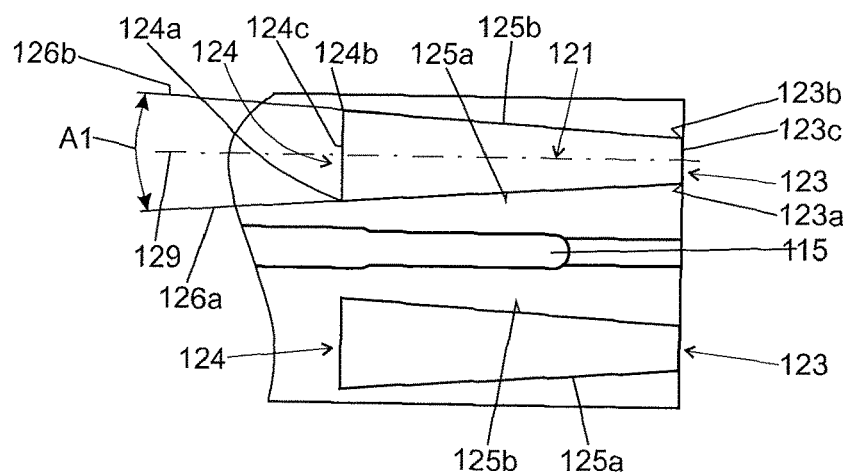
FIG. 4 schematically illustrates an interior area of the outer jacket of FIG. 2, projected as a flat surface.

Each protrusion 121 has a curved contact surface 122 for contacting (and supporting) the inner jacket 130, a front end 123, a rear end 124 spaced apart from the front end 123 by a fixed length, and sides 125a, 125b connecting the front and rear ends 123, 124. And each protrusion front end 123 is at or adjacent the jacket first end 112a, while each protrusion rear end 124 extends toward the jacket second end 112b. Each protrusion front end 123 has endpoints 123a, 123b with an arc length 123c therebetween, and each protrusion rear end 124 has endpoints 124a, 124b with an arc length 124c therebetween, and the arc lengths 123c, 124c are illustrated in FIG. 4 as being projected onto a flat surface along with the sides 125a, 125b. The side 125a of each protrusion 121 connects the end points 123a, 124a, and the side 125b of each protrusion 121 connects the end points 123b, 124b. In the embodiment 100, the front arc length 123c is smaller than the rear arc length 124c. In the projection onto a flat surface (FIG. 4), the front and rear ends 123, 124 are separated by the fixed length, the endpoints 123a, 123b are perpendicularly equidistant from a centerline 129, and the endpoints 124a, 124b are perpendicularly equidistant from the centerline 129. Moreover, the endpoints 123a, 124a are on one side of the centerline 129, and the endpoints 123b, 124b are on an opposite side of the centerline 129.

Figure 3:
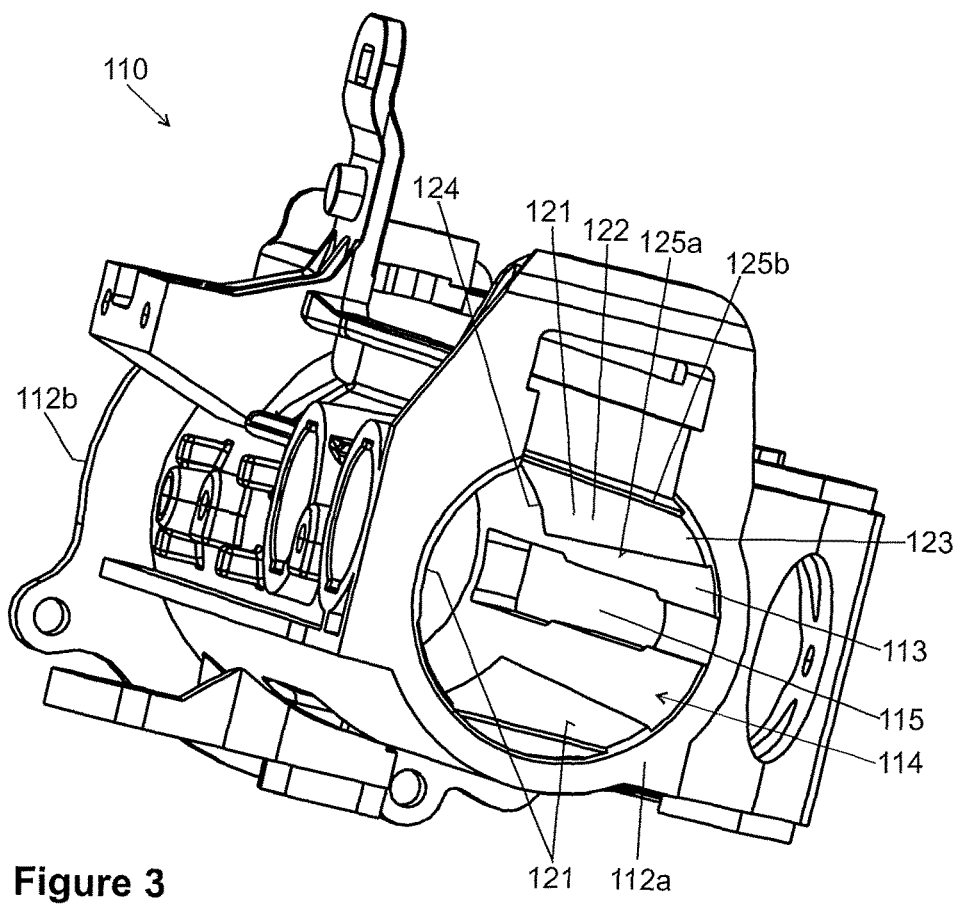
FIG. 3 is another perspective view showing the outer jacket of FIG. 2.

An angle A1 is defined on each projected protrusion profile (FIG. 4) between one straight line 126a passing through the end points 123a, 124a and another straight line 126b passing through the end points 123b, 124b. If the sides 125a, 125b are linear (such as shown in FIGS. 3 and 4), the lines 126a, 126b align with the sides 125a, 125b. In some embodiments, it is critical for improved eigenfrequency characteristics and/or improved stiffness of the adjustable steering column assembly 100 that the angle A1 is at least one degree and no more than fifteen degrees, it may be particularly desirable that the angle A1 be at least one degree and no more than three degrees, and it may be even more particularly desirable that the angle A1 be two degrees.

In use, a driver may adjust the tilt of the steering shaft 150 using the bracket 102 as discussed above, and may use the actuator to move the steering shaft 150 toward or away from the vehicle's passenger cabin (i.e., along the longitudinal axis 150a). The configuration of the protrusions 121, and particularly the value of angle A1, is critical in increasing the eigenfrequency and stiffness of the steering column assembly 100, as the protrusions 121 support the inner jacket 130 and may allow the inner jacket 130 to travel smoothly along the longitudinal axis 150a.

Figure 5:
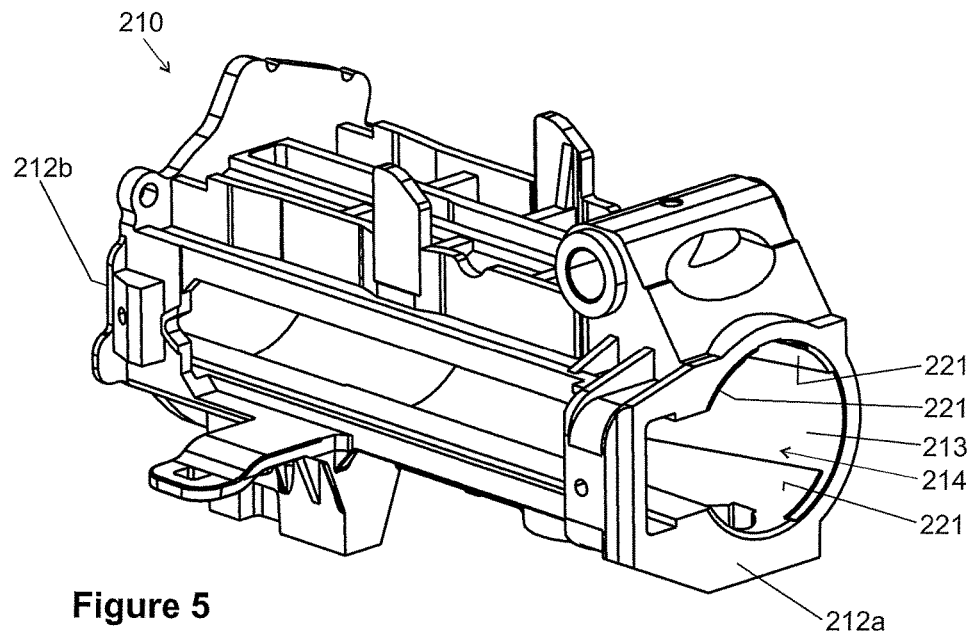
FIG. 5 is a perspective view showing an alternate outer jacket for use with the steering column assembly of FIG. 1.
Figure 6:
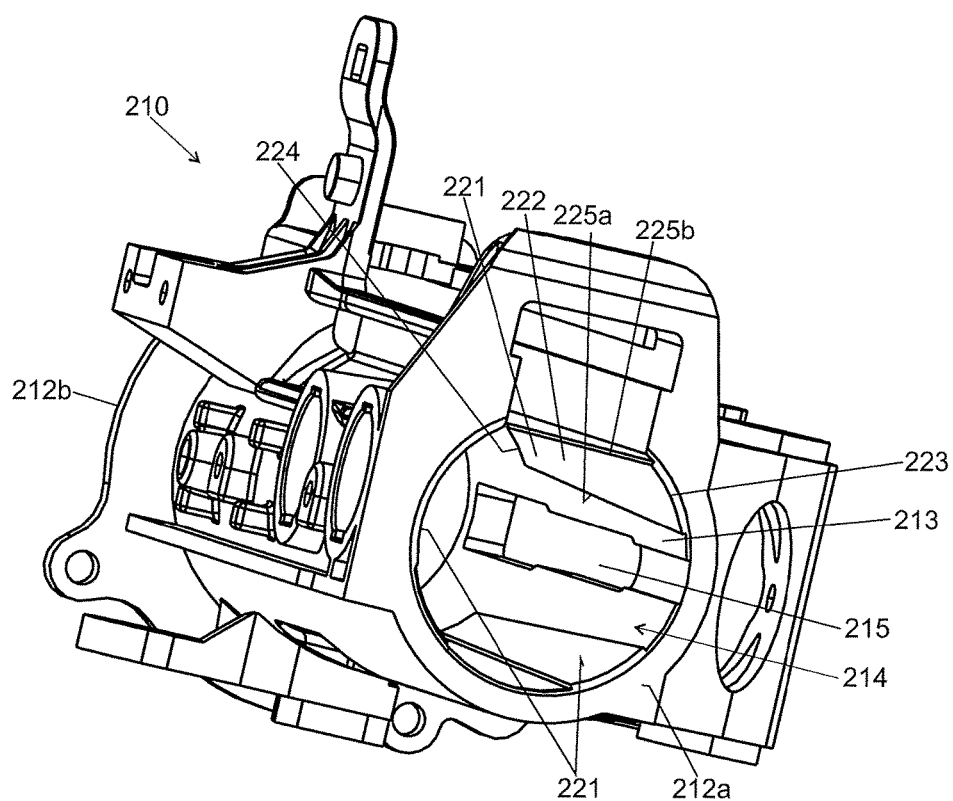
FIG. 6 is another perspective view showing the outer jacket of FIG. 5.
Figure 7:
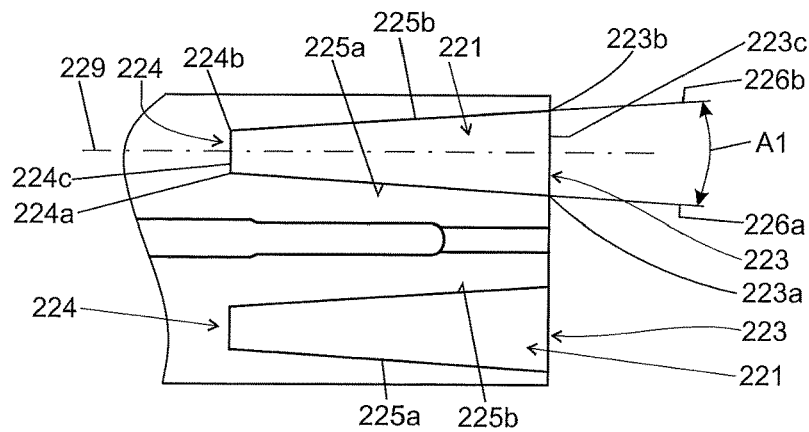
FIG. 7 schematically illustrates an interior area of the outer jacket of FIG. 5, projected as a flat surface.

FIGS. 5 through 7 illustrate another outer jacket 210, according to an embodiment, for use in the adjustable steering column assembly 100 by replacing the outer jacket 110. The outer jacket 210 is substantially similar to the outer jacket 110, except as specifically noted and/or shown, or as would be inherent. Further, those skilled in the art will appreciate that the embodiment 110 (and thus the embodiment 210) may be modified in various ways, such as through incorporating all or part of any of the various described embodiments, for example. For uniformity and brevity, reference numbers from 210 to 229 may be used to indicate elements corresponding to those discussed above numbered from 110 to 129 (e.g., outer jacket 210 corresponds generally to the outer jacket 110, first end 212a corresponds generally to the first end 112a, second end 212b corresponds generally to the second end 112b, inner surface 213 corresponds generally to the inner surface 113, cavity 214 corresponds generally to the cavity 114, slit 215 corresponds generally to the slit 115, protrusion 221 corresponds generally to the protrusion 121, curved contact surface 222 corresponds generally to the curved contact surface 122, protrusion front end 223 corresponds generally to the protrusion front end 123, endpoint 223a corresponds generally to the endpoint 123a, endpoint 223b corresponds generally to the endpoint 123b, arc length 223c corresponds generally to the arc length 123c, protrusion rear end 224 corresponds generally to the protrusion rear end 124, endpoint 224a corresponds generally to the endpoint 124a, endpoint 224b corresponds generally to the endpoint 124b, arc length 224c corresponds generally to the arc length 124c, side 225a corresponds generally to the side 125a, side 225b corresponds generally to the side 125b, line 226a corresponds generally to the line 126a, line 226b corresponds generally to the line 126b, centerline 229 corresponds generally to the centerline 129, et cetera), though with any noted, shown, or inherent deviations.

The primary difference between the outer jacket 210 and the outer jacket 110 is that the front arc length 223c is larger than the rear arc length 224c, while the front arc length 123c is smaller than the rear arc length 124c. As with the jacket 110, the value of angle A1 in the outer jacket 210 is preferably at least one degree and no more than fifteen degrees, more preferably at least one degree and no more than three degrees, and even more preferably two degrees.

Figure 8:
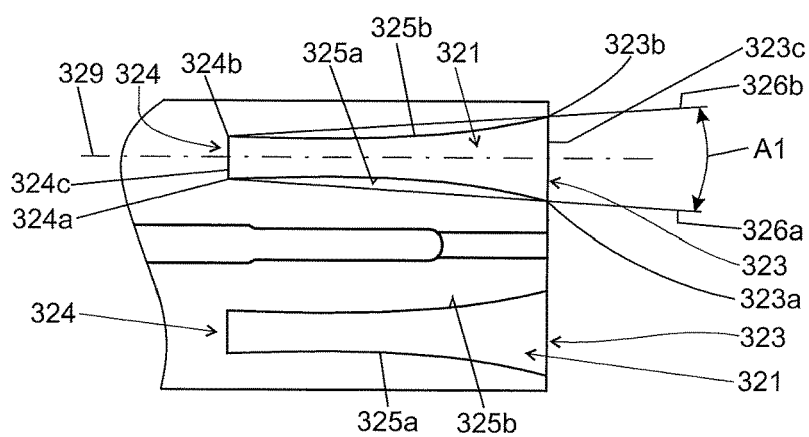
FIG. 8 schematically illustrates an alternate interior area for use in the outer jacket of FIG. 5, projected as a flat surface.

FIG. 8 illustrates another protrusion 321 for use in the adjustable steering column assembly 100 or the adjustable steering column assembly 200. The protrusion 321 is substantially similar to the protrusion 221, except as specifically noted and/or shown, or as would be inherent. Further, those skilled in the art will appreciate that the protrusion 221 (and thus the protrusion 321) may be modified in various ways, such as through incorporating all or part of any of the various described embodiments, for example. For uniformity and brevity, reference numbers from 321 to 329 may be used to indicate elements corresponding to those discussed above numbered from 221 to 229 (e.g., protrusion front end 323 corresponds generally to the protrusion front end 223, endpoint 323a corresponds generally to the endpoint 223a, endpoint 323b corresponds generally to the endpoint 223b, arc length 323c corresponds generally to the arc length 223c, protrusion rear end 324 corresponds generally to the protrusion rear end 224, endpoint 324a corresponds generally to the endpoint 224a, endpoint 324b corresponds generally to the endpoint 224b, arc length 324c corresponds generally to the arc length 224c, side 325a corresponds generally to the side 225a, side 325b corresponds generally to the side 225b, line 326a corresponds generally to the line 226a, line 326b corresponds generally to the line 226b, centerline 329 corresponds generally to the centerline 229, et cetera), though with any noted, shown, or inherent deviations.

The primary difference between the protrusion 321 and the protrusion 221 is that sides 325a, 325b of the protrusion 321 are concave, while the sides 225a, 225b are linear. As with the protrusion 221, the value of angle A1 in the protrusion 321 is preferably at least one degree and no more than fifteen degrees, more preferably at least one degree and no more than three degrees, and even more preferably two degrees.

Figure 9:
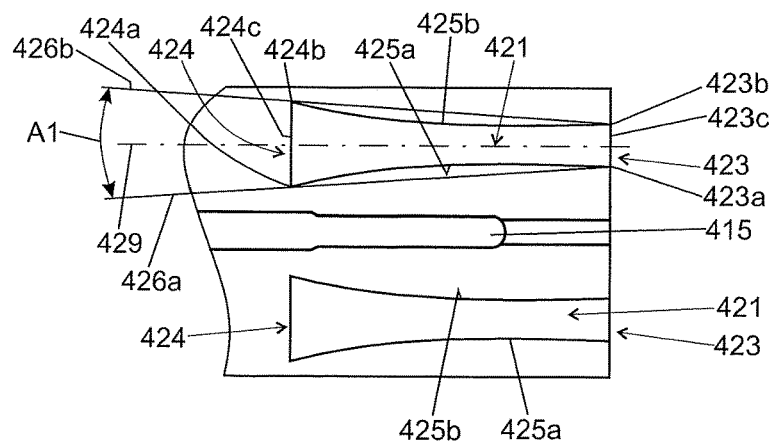
FIG. 9 schematically illustrates another alternate interior area for use in the outer jacket of FIG. 5, projected as a flat surface.

FIG. 9 illustrates another protrusion 421 for use in the adjustable steering column assembly 100 or the adjustable steering column assembly 200. The protrusion 421 is substantially similar to the protrusion 121, except as specifically noted and/or shown, or as would be inherent. Further, those skilled in the art will appreciate that the protrusion 121 (and thus the protrusion 421) may be modified in various ways, such as through incorporating all or part of any of the various described embodiments, for example. For uniformity and brevity, reference numbers from 421 to 429 may be used to indicate elements corresponding to those discussed above numbered from 121 to 129 (e.g., protrusion front end 423 corresponds generally to the protrusion front end 123, endpoint 423a corresponds generally to the endpoint 123a, endpoint 423b corresponds generally to the endpoint 123b, arc length 423c corresponds generally to the arc length 123c, protrusion rear end 424 corresponds generally to the protrusion rear end 124, endpoint 424a corresponds generally to the endpoint 124a, endpoint 424b corresponds generally to the endpoint 124b, arc length 424c corresponds generally to the arc length 124c, side 425a corresponds generally to the side 125a, side 425b corresponds generally to the side 125b, line 426a corresponds generally to the line 126a, line 426b corresponds generally to the line 126b, centerline 429 corresponds generally to the centerline 129, et cetera), though with any noted, shown, or inherent deviations.

The primary difference between the protrusion 421 and the protrusion 121 is that sides 425a, 425b of the protrusion 421 are concave, while the sides 125a, 125b are linear. As with the protrusion 121, the value of angle A1 in the protrusion 421 is preferably at least one degree and no more than fifteen degrees, more preferably at least one degree and no more than three degrees, and even more preferably two degrees.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A steering column assembly for use with a vehicle, comprising:
a steering shaft having a longitudinal axis;
an inner jacket supporting the steering shaft with the steering shaft being rotatable about the longitudinal axis; and
an outer jacket comprising:
a first end that is passenger facing and an opposite second end;
a cavity defined by an inner surface extending from the first end toward the second end; and
at least two protrusions extending from the inner surface into the cavity, each protrusion comprising:
a curved contact surface;
a front end at or adjacent the outer jacket first end, the front end having first and second endpoints with a front arc length therebetween;
a rear end extending toward the outer jacket second end, the rear end having third and fourth endpoints with a rear arc length therebetween; and
two sides respectively connecting the first and second endpoints of the front end with the third and fourth endpoints of the rear end, such that a first of the sides is associated with the first and third endpoints and a second of the sides is associated with the second and fourth endpoints;
wherein each of the at least two protrusions is configured such that:
(a) projecting the front end, the rear end, and the two sides onto a flat surface; and
(b) measuring an angle between one straight line passing through the first and third endpoints and another straight line passing through the second and fourth endpoints
results in an angular measurement of at least one degree and no more than fifteen degrees; and
wherein the curved contact surface of each of the at least two protrusions supports the inner jacket with the inner jacket being telescopic along the longitudinal axis.

2. The steering column assembly of claim 1, wherein the angular measurement is at least one degree and no more than three degrees.

3. The steering column assembly of claim 1, wherein the front arc length is larger than the rear arc length.

4. The steering column assembly of claim 1, wherein the front arc length is smaller than the rear arc length.

5. The steering column assembly of claim 1, wherein each of the two sides is linear.

6. The steering column assembly of claim 1, wherein each of the two sides is concave.

7. The steering column assembly of claim 1, wherein each of the two sides is convex.

8. The steering column assembly of claim 1, wherein the at least two protrusions is three protrusions.

9. The steering column assembly of claim 1, further comprising an actuator for moving the inner jacket relative to the outer jacket along the longitudinal axis.

10. The steering column assembly of claim 9, wherein the steering shaft has an end for receiving a steering wheel.

11. A steering column assembly for use with a vehicle, comprising:
a steering shaft having a longitudinal axis;
an inner jacket supporting the steering shaft with the steering shaft being rotatable about the longitudinal axis; and
an outer jacket comprising:
a first end and an opposite second end;
a cavity defined by an inner surface extending from the first end toward the second end; and
at least two protrusions extending from the inner surface into the cavity, each protrusion comprising:
a curved contact surface;
a front end at or adjacent the outer jacket first end, the front end having first and second endpoints with a front arc length therebetween; and
a rear end extending toward the outer jacket second end and being spaced apart from the front end by a fixed length, the rear end having third and fourth endpoints with a rear arc length therebetween;
wherein each of the at least two protrusions is configured such that:
(a) projecting the front end and the rear end onto a flat surface with the front end being separated from the rear end by the fixed length, the first and second endpoints being perpendicularly equidistant from a centerline, the third and fourth endpoints being perpendicularly equidistant from the centerline, the first and third endpoints being on one side of the centerline, and the second and fourth endpoints being on an opposite side of the centerline; and
(b) measuring an angle between one straight line passing through the first and third endpoints and another straight line passing through the second and fourth endpoints
results in an angular measurement of at least one degree and no more than fifteen degrees; and
wherein the curved contact surface of each of the at least two protrusions supports the inner jacket with the inner jacket being telescopic along the longitudinal axis.

12. The steering column assembly of claim 11, wherein the angular measurement is at least one degree and no more than three degrees.

13. The steering column assembly of claim 11, wherein the angular measurement is two degrees.

14. The steering column assembly of claim 11, wherein the front arc length is larger than the rear arc length.

15. The steering column assembly of claim 11, wherein the front arc length is smaller than the rear arc length.

16. The steering column assembly of claim 11, wherein the at least two protrusions is three protrusions.

17. The steering column assembly of claim 11, further comprising an actuator for moving the inner jacket relative to the outer jacket along the longitudinal axis.

18. An outer jacket for use in a vehicle steering column assembly to telescopically support an inner jacket, the outer jacket comprising:
a first end and an opposite second end;
a cavity defined by an inner surface extending from the first end toward the second end; and
at least two protrusions extending from the inner surface into the cavity, each protrusion comprising:
a curved contact surface;
a front end at or adjacent the outer jacket first end, the front end having first and second endpoints with a front arc length therebetween;

a rear end extending toward the outer jacket second end, the rear end having third and fourth endpoints with a rear arc length therebetween; and two sides respectively connecting the first and second endpoints of the front end with the third and fourth endpoints of the rear end, such that a first of the sides is associated with the first and third endpoints and a second of the sides is associated with the second and fourth endpoints;

wherein each of the at least two protrusions is configured such that:
  (a) projecting the front end, the rear end, and the two sides onto a flat surface; and
  (b) measuring an angle between one straight line passing through the first and third endpoints and another straight line passing through the second and fourth endpoints
  results in an angular measurement of at least one degree and no more than fifteen degrees.

19. The steering column assembly of claim 18, wherein the angular measurement is at least one degree and no more than three degrees.

20. The steering column assembly of claim 18, wherein each of the sides is selected from the group consisting of: straight, concave, and convex.

* * * * *